United States Patent Office 3,418,246
Patented Dec. 24, 1968

3,418,246
RARE EARTH ACTIVATED YTTRIUM AND GADOLINIUM OXY-CHALCOGENIDE PHOSPHORS
Martin R. Royce, Lancaster, Pa., assignor to Radio Corporation of America, a corporation of Delaware
No Drawing. Continuation-in-part of application Ser. No. 442,494, Mar. 24, 1965. This application Dec. 28, 1967, Ser. No. 694,079
13 Claims. (Cl. 252—301.4)

ABSTRACT OF THE DISCLOSURE

A family of cathodoluminescent phosphors which consist essentially of oxy-chalcogenides of yttrium and/or gadolinium containing, for each mol of phosphor, between 0.0002 and 0.2 mol of dysprosium, erbium, europium, holmium, neodymium, praseodymium, samarium, terbium, and thulium. Up to 25 mol percent of the yttrium and/or gadolinium may be replaced with lanthanum and/or lutetium. The phosphors may be prepared by reacting the contstituent elements as compounds thereof at temperatures between 900 and 1300° C. for 0.2 to 5.0 hours and then cooling the reaction product.

Cross references

This is a continuation-in-part application of patent application, Ser. No. 442,494, filed Mar. 24, 1965 by Martin R. Royce now abandoned.

Background of the invention

This invention relates to a family of new cathodoluminescent phosphors and to a method for preparing the novel phosphors.

In U.S. Patent No. 2,462,547, there is described a family of phosphors consisting essentially of lanthanum oxy-sulfide containing two activators; for example, europium and samarium. The phosphors of this family are infrared-stimulable storage phosphors; that is, they are useful for emitting light upon excitation with ultraviolet light and also emit upon subsequent stimulation with infrared light. These phosphors may be prepared by heating a mixture of lanthanum sulfate with suitable proportions of activator compounds in a reducing gas at about 800° C.

An object of the invention is to provide new phosphors which are particularly useful for emitting light upon excitation with cathode rays.

Another object is to provide a method for preparing the novel phosphors.

The new phosphors consist essentially of oxy-chalcogenides of yttrium and/or gadolinium containing for each mol of the phosphor, between 0.0002 and 0.2 mol of a member of the group consisting of dysprosium, erbium, europium, holmium, neodymium, praseodymium, samarium, terbium, and thulium. Up to about 25 mol percent of the yttrium and/or gadolinium may be replaced with lanthanum and/or lutetium. The phosphors may be described as luminescent materials whose empirical formula is substantially:

$$M'_{2-x}M''_xO_2Ch$$

where:

M' is at least one member of the group consisting of Y and Gd;
M'' is a member of the group consisting of Dy, Er, Eu, Ho, Nd, Pr, Sm, Tb, and Tm;
O is oxygen;
Ch is a member of the group consisting of S, Se, and Te; and
$x$ is between 0.0002 and 0.2.

Up to about 25 mol percent of the M' may be replaced with La and/or Lu to produce substantially equivalent brightness. Greater amounts than about 25 mol percent result in phosphor of inferior brightness.

The novel phosphors may be prepared by any of a variety of processes which bring together the constituents M', M'', Ch, and O at temperatures between 900 and 1300° C. For example, a mixture of oxides of M' and M'' may be heated in an atmosphere containing compounds of Ch. Or, a mixture of chalcogenates of M' and M'' may be heated in a reducing atmosphere.

In the new phosphors, only one activator element is used for M'', whereas two activator elements are used for M'' in the prior art. Doubly-activated phosphors have been examined under cathode ray excitation and have been found to be unsuitable in most applications in cathode ray tubes for at least two reasons. The presence of two activator elements produces a less saturated emission color which makes them of little commercial interest. Also, when two activators are present, one activator may have a quenching effect upon emission lines of the other activator. This has the overall effect of reducing the visual brightness of the emission.

The new phosphors may be used in a wide variety of applications as cathodoluminescent or photoluminescent emitters. Particular phosphors may be especially suited for particular uses. For example, phosphors in which M'' is Eu or Sm, such as $Y_{1.90}Eu_{0.10}O_2S$ and $Gd_{1.98}Sm_{0.02}O_2S$, may be used as red-emitting target materials in cathode ray tubes. Phosphors in which M'' is Tb, such as $Y_{1.99}Tb_{0.01}O_2S$ and $Y_{1.97}Tb_{0.03}O_2S$, may be used respectively as blue and green-emitting target materials in cathode ray tubes.

The color and brightness of emission of a particular phosphor is related to the selection of M'' and $x$. The color of emission is directly related to the favored radiative energy transitions of the particular M'' selected. Hence, each phosphor will have an emission color which is characteristic of the M'' present. The favored energy transitions for a particular M'' is influenced by the value of $x$. Thus, some energy transitions are enhanced and others suppressed when the value of $x$ is changed. For example, when M'' is Eu, the visual emission color of phosphors with low values of $x$ is yellow-white and is deep red for phosphors with values of $x$ above 0.05. As another example, when M'' is Tb, the visual emission color is blue for phosphors with low values of $x$, and is green for phosphors with values of $x$ above .02.

The selections of M' and Ch have only a minor effect on the color of emission of the phosphor. Thus, with the same selection of M'' and $x$, oxy-sulfides, oxy-selenides, and oxy-tellurides of yttrium, gadolinium, or yttrium and gadolinium, may be provided which have substantially the same characteristics, but which may differ somewhat in their emission characteristics.

The new phosphors are preferably synthesized by co-precipitating oxalates of M' and M'' from a solution of nitrates of M' and M'' with oxalic acid. The coprecipitated oxalates are then converted to a mixed oxide by heating in air at temperatures between 600 and 1300° C. for 0.2 to 5.0 hours. The mixed oxides is then heated in an atmosphere of $H_2Ch$ at temperatures between 900° and 1300° C. for 0.2 to 5.0 hours.

The new phosphors may also be synthesized by one or more of the following processes which are described for making oxy-sulfides. Oxy-selenides and oxy-tellurides may be made by modifying the process in a manner known in the art.

(1) Heating a mixture of oxalates of M' and M'' in an atmosphere of $H_2S$ at temperatures between 900 and 1300° C. for 0.2 to 5.0 hours.

(2) Heating a mixture of sulfates of M' and M" in a reducing atmosphere, such as hydrogen atmosphere, at temperatures between 900° and 1300° C. for 0.2 to 5.0 hours.

(3) Heating a mixture of oxides of M' and M" in a sulfurizing atmosphere, such as a carbon disulfide atmosphere, at temperatures between 900 and 1300° C. for 0.2 to 5.0 hours.

(4) Heating a mixture of sulfur and oxides, or oxalates, or sulfates of M' and M" in a nitrogen or hydrogen atmosphere at temperatures between 900 and 1300° C. for 0.2 to 5.0 hours.

(5) Heating a mixture of sulfates of M' and M" in a sulfurizing atmosphere such as hydrogen sulfide or carbon disulfide, at temperatures between 900° and 1300° C. for 0.2 to 5.0 hours.

(6) Heating a mixture of sulfur, sodium carbonate, and oxides or oxalates of M' and M" in a covered crucible, in air at temperatures between 900° and 1300° C. for 0.2 to 5.0 hours.

(7) Heating a mixture of sodium thiosulfate and oxides or oxalates or sulfates of M' and M" in a covered crucible, in air, at temperatures between 900° and 1300° C. for 0.2 to 5.0 hours.

It has been found that the presence of one or more other rare earth cations, in trace amounts, in the novel phosphors has a beneficial effect. For example, it has been found that up to 50 p.p.m. (parts per million) terbium and/or praseodymium enhances the cathodoluminescent brightness of europium-activated yttrium oxysulfide. The presence of greater amounts of terbium and/or praseodymium diminishes the brightness of this phosphor. The presence of 10 to 30 p.p.m. terbium in this phosphor increased the cathodoluminescent brightness by 15 to 30 percent over similar terbium-free phosphors. The presence of 10 to 30 p.p.m. praseodymium in this phosphor increases the cathodoluminescent brightness by 10 to 30 percent over similar terbium-free phosphors. The concentration (trace amounts) of the other cations is so small that the spectral distribution of the luminescene emission is substantially unaffected and hence these other cations are not classed as primary activators. Likewise, these other cations do not produce storage properties in the phosphors and hence are not classed as secondary activators.

EXAMPLE 1

Dissolve about 220 grams of yttrium oxide and 10.56 grams of europium oxide in nitric acid and dilute with water to a volume of about 3500 ml. Add to this nitrate solution with constant stirring about 2300 cc. of a 10% solution of oxalic acid, whereby a coprecipitate of yttrium and europium oxalates is formed. Filter off the coprecipitate, and then wash and dry the coprecipitate. Heat the dry coprecipitate in air at about 1250° C. for about 1 hour to convert the coprecipitate to a mixed oxide. Then, heat the mixed oxide in an atmosphere of flowing hydrogen sulfide at about 1100° C. for about 1 hour and then cool to room temperature.

The product is a powder having a light rouge body color. With minor variation ordinarily occurring in the process, the product may have a different body color. For example, the body color may be white, straw, yellow, tan, pink, peach, orange, gray, or red. All of these varieties of the product of Example 1 have the empirical formula $Y_{1.94}Eu_{0.06}O_2S$ as evidenced by chemical and X-ray analysis.

The product is both photoluminescent and cathodoluminescent with a red visual emission color. The product is a line emitter type of phosphor with a principal peak at about 6260 A. and with a strong minor peak at about 6175 A. The product may be used as a red-emitting component in kinescopes; for example, for color television.

EXAMPLE 2

Follow the procedure described in Example 1, except start with about 220 grams of yttrium oxide and 10.47 grams of samarium oxide. The product is a white powder (which may also vary in body color) having an approximate empirical formula $Y_{1.94}Sm_{0.06}O_2S$.

The product is both photoluminescent and cathodoluminescent with a red visual emission color. The product is a line emitter type of phosphor with a principal peak at about 6075 A. and with strong minor peaks at about 6100 A. and 6580 A. The product may be used as a red-emitting component in kinescopes.

EXAMPLE 3

Follow the procedure described in Example 1 except start with about 226 grams of yttrium oxide and 0.366 gram of terbium oxide. The product is a white powder (which also may vary in body color), having the approximate empirical formula $Y_{1.998}Tb_{0.002}O_2S$.

The product is both photoluminescent and cathodoluminescent with a blue visual emission color. The product is a line emitting type of phosphor, with a principal peak at about 4180 A., and with strong minor peaks at about 4400, 4584, 4750, 5440, and 5480 A. The product may be used as a blue-emitting component in kinescopes.

EXAMPLE 4

Follow the procedure described in Example 1 except start with about 224 grams of yttrium oxide and 3.66 grams of terbium oxide. The product is a white powder (which also may vary in body color) having the approximate empirical formula $Y_{1.98}Tb_{0.02}O_2S$.

The product is both photoluminescent and cathodoluminescent with a green visual emission color. The product is a line emitter type of phosphor, with a principal peak at about 5460 A. and with strong minor peaks at 4180, 4400, 4700, 5870, and 6280 A. The product may be used as a green-emitting component in cathode ray tubes.

EXAMPLE 5

Follow the procedure described in Example 1 except start with about 351 grams of gadolinium oxide and 10.56 grams of europium oxide. The product is a white powder (which may vary in body color) having the approximate empirical formula $Gd_{1.94}Eu_{0.06}O_2S$. The product is both cathodoluminescent and photoluminescent with a red visual emission color. The product is a line emitter type of phosphor, with a principal peak at about 6260 A. and with a strong minor peak at about 6175 A.

EXAMPLE 6

Follow the procedure described in Example 1 except start with about 220 grams of yttrium oxide and 11.62 grams of thulium oxide. The product is a white powder having the approximate empirical formula $$Y_{1.94}Tm_{0.06}O_2S$$

The product is both photoluminescent and cathodoluminescent with a deep blue visual emission color. The product is a line emitter type of phosphor, with a principal peak at about 4590 A. and minor peaks at 4780 and 4820 A.

What is claimed is:
1. A phosphor consisting essentially of an oxy-chalcogenide of at least one member of the group consisting of yttrium and gadolinium wherein up to 25 mol percent of said yttrium and gadolinium is replaced with lanthanum or lutetium, said phosphor containing, for each mol of said phosphor, between 0.0002 and 0.2 mol of a member of the group consisting of dysprosium, erbium, europium, holmium, neodymium, praseodymium, samarium, terbium, and thulium.

2. A phosphor according to claim 1 consisting essentially of a yttrium oxy-sulfide containing between 0.0002 and 0.2 mol of europium per mol of said phosphor.

3. A phosphor according to claim 1 consisting essentially of a gadolinium oxy-sulfide containing between 0.0002 and 0.2 mol of europium per mol of said phosphor.

4. A luminescent material whose empirical formula is $$M'_{(2-x)}M''_xO_2Ch$$

where: M' is at least one member of the group consisting of Y and Gd; M" is a member of the group consisting of Dy, Er, Eu, Ho, Nd, Pr, Sm, Tb, and Tm; O is oxygen; Ch is a member of the group consisting of S, Se, and Te; and $x$ is between 0.0002 and 0.2.

5. A luminescent material according to claim 4 whose empirical formula is $$Y_{(2-x)}M''_xO_2S$$

where: Y is yttrium; M" is a member of the group consisting of Dy, Er, Eu, Ho, Nd, Pr, Sm, Tb, and Tm; O is oxygen; S is sulfur; and $x$ is between 0.0002 and 0.2.

6. A luminescent material according to claim 5 having the empirical formula $$Y_{(2-x)}Tm_xO_2S$$

where: $x$ is between 0.0002 and 0.2.

7. A luminescent material according to claim 5 having the empirical formula $$Y_{(2-x)}Sm_xO_2S$$

where: $x$ is between 0.0002 and 0.2.

8. A luminescent material according to claim 5 having the empirical formula $$Y_{(2-x)}Tb_xO_2S$$

where: $x$ is between 0.0002 and 0.2.

9. A luminescent material according to claim 5 having the empirical formula $$Y_{(2-x)}Eu_xO_2S$$

where: $x$ is between 0.0002 and 0.2.

10. A luminescent material according to claim 9 containing up to 50 parts per million of at least one of terbium and praseodymium.

11. A luminescent material according to claim 4 whose empirical formula is substantially $$Gd_{(2-x)}M''_xO_2S$$

where: Gd is gadolinium; M" is at least one member of the group consisting of Dy, Er, Eu, Ho, Nb, Pr, Sm, Tb, and Tm; O is oxygen; S is sulfur; and $x$ is between 0.0002 and 0.2.

12. A luminescent material according to claim 11 having the empirical formula $$Gd_{(2-x)}Eu_xO_2S$$

where: $x$ is between 0.0002 and 0.2.

13. In a method for preparing a phosphor whose empirical formula is substantially $$M'_{(2-x)}M''_xO_2Ch$$

where: M' is at least one member of the group consisting of Y and Gd and wherein; M" is a member of the group consisting of Dy, Er, Eu, Ho, Nd, Pr, Sm, Tb and Tm; O is oxygen; Ch is at least one member of the group consisting of S, Se, and Te; $x$ is between 0.0002 and 0.2; the steps comprising reacting M', M", Ch, and O in the form of compounds thereof at temperatures between 900 and 1300° C. for 0.2 to 5.0 hours, thereby forming said phosphor, and then cooling said phosphor.

References Cited

UNITED STATES PATENTS

| | | | |
|---|---|---|---|
| 2,462,547 | 2/1949 | Pitha et al. | 252—301.4 |
| 2,979,467 | 4/1961 | Kelley | 252—301.4 |
| 3,250,722 | 5/1966 | Borchardt | 252—301.4 |
| 3,322,682 | 5/1967 | Thompson | 252—301.4 |

TOBIAS E. LEVOW, *Primary Examiner.*

ROBERT D. EDMONDS, *Assistant Examiner.*